United States Patent
Stenson et al.

(10) Patent No.: US 11,078,371 B2
(45) Date of Patent: Aug. 3, 2021

(54) METHOD FOR APPLYING A COATING TO AN EXTERNAL SURFACE OF A MAN-MADE OBJECT TO BE AT LEAST PARTLY IMMERSED IN WATER

(71) Applicant: Akzo Nobel Coatings International B.V., Arnhem (NL)

(72) Inventors: Phil Stenson, Whitesmocks (GB); Barry Kidd, Newcastle upon Tyne (GB); Haoliang Chen, Singapore (SG); Richard Mark Ramsden, Gateshead (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/767,295

(22) PCT Filed: Oct. 11, 2016

(86) PCT No.: PCT/EP2016/074257
§ 371 (c)(1),
(2) Date: Apr. 10, 2018

(87) PCT Pub. No.: WO2017/064016
PCT Pub. Date: Apr. 20, 2017

(65) Prior Publication Data
US 2018/0305561 A1    Oct. 25, 2018

(30) Foreign Application Priority Data
Oct. 15, 2015    (EP) .................................... 15189877

(51) Int. Cl.
*C09D 5/16*    (2006.01)
*B63B 71/00*    (2020.01)
(Continued)

(52) U.S. Cl.
CPC ............. *C09D 5/1681* (2013.01); *B05D 7/14* (2013.01); *B63B 71/00* (2020.01); *C09D 5/16* (2013.01);
(Continued)

(58) Field of Classification Search
CPC ....................................................... C09D 5/16
See application file for complete search history.

(56) References Cited

U.S. PATENT DOCUMENTS

2015/0081231 A1    3/2015    Mieno

FOREIGN PATENT DOCUMENTS

EP    1 084 947 A1    3/2001
EP    1 084 948 A1    3/2001
(Continued)

OTHER PUBLICATIONS

M.J. King "The Measurement of Ship Hull Roughness", Wear 1982, vol. 83, p. 385-397.
(Continued)

*Primary Examiner* — Dah-Wei D. Yuan
*Assistant Examiner* — Andrew J Bowman
(74) *Attorney, Agent, or Firm* — McDonnell Boehnen Hulbert & Berghoff LLP

(57) ABSTRACT

The disclosure relates to a method of applying a coating to an external surface of a man-made object to be at least partly immersed in water (e.g. a vessel or an offshore drilling station) for a time period wherein there is relative movement between the immersed object and the water. The applied coating has a minimal resistance rating for a set of coatings. The method comprises a computer-implemented coating selection process, which comprises a first steps of obtaining, for each coating in the set of coatings, a total roughness value of the external surface based on a fouling roughness value, a macro roughness value and a micro roughness value
(Continued)

associated with each coating. The coating selection process comprises in a second step selecting a coating from the set of coatings, wherein the selected coating has a minimal resistance rating associated with the obtained total roughness value for the time period. The method further comprises applying the selected coating to the external surface of the man-made object.

17 Claims, 10 Drawing Sheets

(51) Int. Cl.
*B05D 7/14* (2006.01)
*B63B 59/04* (2006.01)
*G01N 19/02* (2006.01)

(52) U.S. Cl.
CPC ............ *C09D 5/1693* (2013.01); *B63B 59/04* (2013.01); *G01N 19/02* (2013.01)

(56) References Cited

FOREIGN PATENT DOCUMENTS

| EP | 1 484 700 A1 | 12/2004 | |
|---|---|---|---|
| WO | 2013/092681 A1 | 6/2013 | |
| WO | WO2013/092681 | * 6/2013 | ............... C09D 5/16 |

OTHER PUBLICATIONS

King, "The Measurement of Ship Hull Roughness", Wear, 1982, vol. 83, 385-397.

Seaflo Neo, "A Unique Anti-fouling "Beyond Silyl" from low VOC and fuel savings to environmental protection—a new generation", Chugoku Marine Paints, Ltd., 2013, 6 pages.

ABS, "Coating Systems: A Guidance Manual for Field Surveyors, Guidance Notes on the Application and Maintenance of Marine Coating Systems", 2004, 106 pages.

Carlton, "Marine Propellers and Propulsion, 2nd ed.", Elsevier Ltd., 2007, 31 pages.

Perry, "Underwater Hull Surface Painting Strategy—A Shipowners Conclusions", The Institute of Marine Engineers, Trans I Mar E (TM), 1985, vol. 97, Paper 12, 15 pages.

Whitepaper-Coatings Performance: Ship performance, "New benchmark to prove coatings performance", 2012, 4 pages.

Marine Coatings, "Propeller International", 2003, Issue 15, 16 pages.

Howell et al., "A review of surface roughness in antifouling coatings illustrating the importance of cutoff length", Biofouling, 2006, 22(6), 401-410.

Schultz, "Effects of coating roughness and biofouling on ship resistance and powering", Biofouling, 2007, 23(5) 331-341.

Schultz et al., "Economic impact of biofouling on a naval surface ship", Biofouling, 2011, 27(1), 87-98.

Woods Hold Oceanographic Institution, "Marine fouling and its prevention", United States Naval Institute, 1952, 63 pages.

Durr, "Biofouling", Wiley-Blackwell, 2010, pp. 170-171, 218-219, 352-353 and 376-377.

International Association of Classification Societies (IACS), "Classification societies—what, why and how?", 2011, 16 pages.

Hellio et al., "Advances in marine antifouling coatings and technologies", Woodhead Publishing Limited, 2009, 4-6.

Hellio et al., "Advances in marine antifouling coatings and technologies", Woodhead Publishing Limited, 2009, 429-430.

Bader-Eldin, "Hull roughness and antifouling paint", College of Maritime Transport and Technology, Arab Academy for Science and Technology and Maritime Transport, 15 pages.

Semantic Scholar, "Hull roughness and antifouling paint", 2014, 4 pages.

International Marine Coatings, "Hull Roughness Penalty Calculator: The economic importance of hull condition", 2004, 11 pages.

Jotun Marine Coatings, "Hull Protection Plus: Optimum Antifouling and Corrosion Prevention", 25 pages.

Diamond, "Menu Management versus Fouling", PPCJ, 1998, 2 pages.

Energiokonomisering i skipsfarten, NTNF and English translation, "Simplified Tool for Calculating the Relationship Between Surface Roughness of Solid Surfaces and Propulsion Resistance", 1985, 45 pages.

Schultz, "Frictional Resistance Antifouling Coating Systems", Journal of Fluids Engineering, ASME, 2004, vol. 126, 10 pages.

* cited by examiner

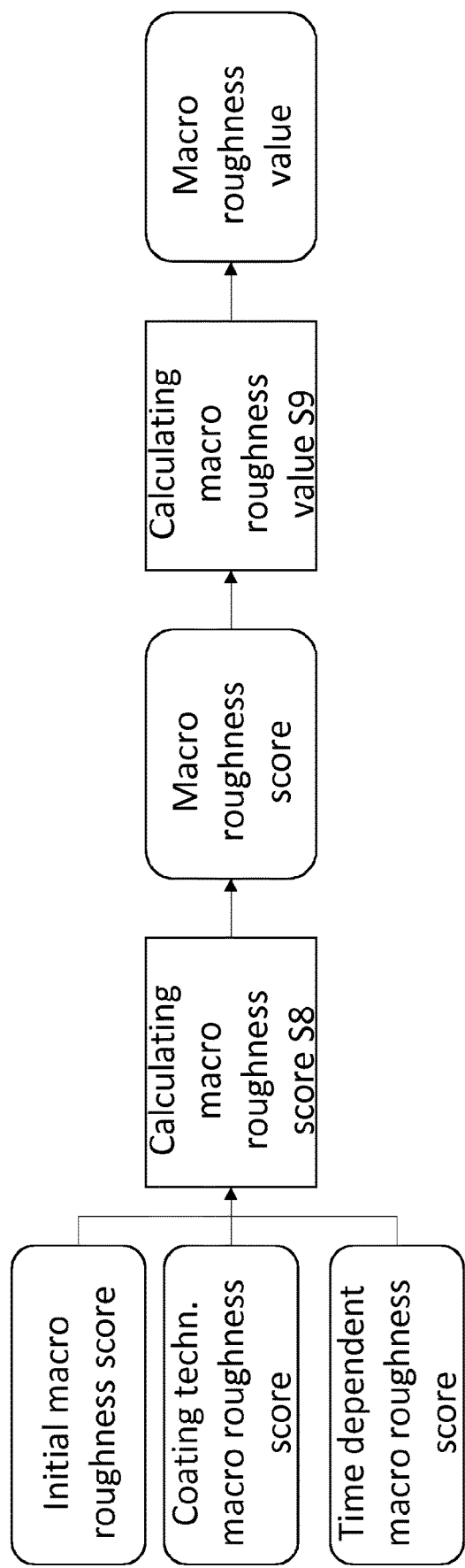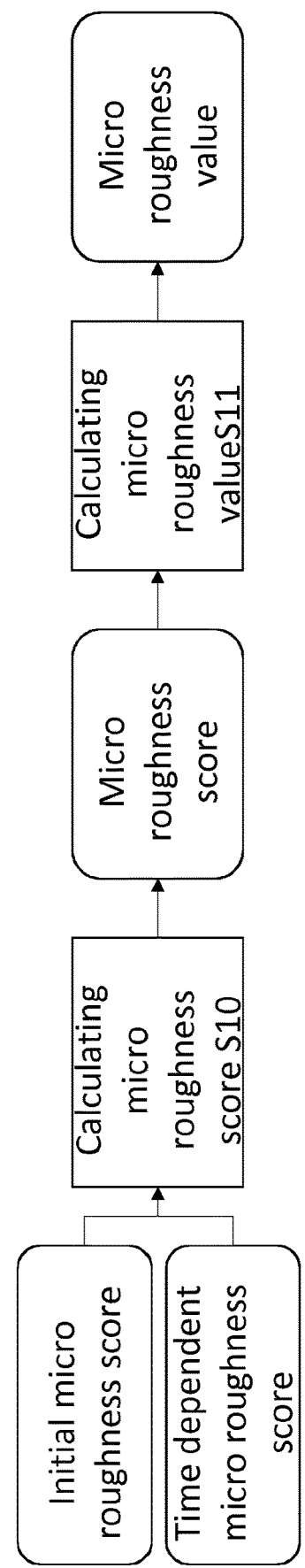
Fig. 4
Fig. 5

Table

| Fouling score | Static fouling roughness value |
|---|---|
| 0-1 | 100 |
| 1-2 | 300 |
| 2-3 | 500 |
| 3-5 | 700 |
| 5-7 | 800 |
| 7-10 | 1000 |

Fig. 9

Roughness database

| Coating | Geographical region | Static fouling roughness value |
|---|---|---|
| Coating 1 | Atlantic ocean | 500 |
| Coating 1 | Indian ocean | 200 |
| Coating 1 | South Pacific ocean | 100 |
| Coating 2 | Atlantic ocean | 600 |
| Coating 2 | Indian ocean | 700 |
| Coating 2 | South Pacific ocean | 300 |
| Coating 3 | Atlantic ocean | 300 |
| Coating 3 | Indian ocean | 200 |
| Coating 3 | South Pacific ocean | 400 |

Fig. 7

Fouling database

| Ship | Coating | Geographical region | Fouling parameters | | Fouling score | Subgroup |
|---|---|---|---|---|---|---|
| | | | Light slime % | Heavy slime % | | |
| Ship A | Coating 1 | Atlantic Ocean | 50 | 30 | 3.7 | Low |
| Ship B | Coating 1 | Atlantic Ocean | 60 | 40 | 4.7 | Medium |
| Ship C | Coating 1 | Atlantic Ocean | 10 | 90 | 8.3 | High |
| Ship D | Coating 1 | Atlantic Ocean | 40 | 40 | 4.0 | Low |
| Ship E | Coating 1 | Atlantic Ocean | 40 | 30 | 3.3 | Low |
| Ship F | Coating 1 | Atlantic Ocean | 30 | 60 | 5.0 | Medium |
| Ship G | Coating 1 | Atlantic Ocean | 40 | 40 | 4.0 | Low |
| Ship H | Coating 1 | Atlantic Ocean | 50 | 20 | 3.0 | Low |
| Ship I | Coating 1 | Atlantic Ocean | 30 | 30 | 3.0 | Low |
| Ship J | Coating 1 | Atlantic Ocean | 40 | 20 | 2.7 | Low |

Fig. 8

METHOD FOR APPLYING A COATING TO AN EXTERNAL SURFACE OF A MAN-MADE OBJECT TO BE AT LEAST PARTLY IMMERSED IN WATER

This application is the US national phase under 35 U.S.C. § 371 of international application PCT/EP2016/074257, filed Oct. 11, 2016, which claims priority to European application 15189877.2, filed Oct. 15, 2015.

FIELD OF THE INVENTION

The invention relates to a method for applying a coating to an external surface of a man-made object to be at least partly immersed in water. More particularly, the invention relates to a method for applying a coating, wherein the coating has a minimal resistance rating in a set of coatings and wherein a total roughness value of the external surface is calculated for each coating in the set of coatings based on a fouling roughness value, a macro roughness value and a micro roughness value.

BACKGROUND OF THE INVENTION

Man-made objects such as ship and boat hulls and other water craft, buoys, drilling platforms, oil production rigs and the like which are at least partly immersed in water are prone to fouling by aquatic organisms such as slime, green and brown algae, barnacles, mussels, and the like. Such structures are commonly of metal, but may also comprise other structural materials such as concrete or wood. This fouling is a nuisance on boat hulls, because it increases frictional resistance during movement through the water, the consequence being reduced speeds and increased fuel costs. It is a nuisance on static structures such as the legs of drilling platforms and oil production rigs, firstly because the thick layers of fouling can unpredictably increase the wave and current-induced hydrodynamic forces on the structures to a potentially dangerous level, and, secondly, because fouling makes it difficult to inspect the structure for defects such as stress cracking and corrosion.

Maintenance of such immersed man-made objects at regular time intervals is key to maximising the lifetime and operational efficiency of the object. For example, for commercial shipping the maintenance of the underwater hull is typically performed during a dry docking of the vessel, wherein the period between launch and the first dry docking, or between subsequent dry dockings is referred to as a dry dock cycle. This dry dock cycle is typically three to five years but may be longer or shorter. Additionally more regular maintenance of the propeller and propulsion system may be performed.

With respect to the maintenance of these immersed man-made objects, coatings are known to be applied to their exterior surfaces. For example, for ships and boats, coatings may be applied during the building process and at subsequent dry dockings to limit the frictional drag, or resistance, of the vessel. The coatings typically provide a smooth surface on the hull and prevent fouling by marine organisms, thereby reducing the effective roughness of the hull, and reducing the resistance of the ship when it moves through the water. Similarly, coatings may be applied to propellers and other external surfaces. Successfully reducing the resistance may result in substantial benefits for vessel operators. Maintaining a lower resistance may lead to a combination of benefits such as higher sailing speeds, lower fuel costs and reduced emissions of environmental hazardous substances for example greenhouse gases or polyaromatic hydrocarbon particulates. To illustrate, a ship whose hull and propeller are in a very poor condition, i.e. are heavily fouled, may burn 40% more fuel and emit 40% more greenhouse gases when operating at the same speed as an equivalent ship which is in good condition, i.e. is relatively clean and smooth.

In the case of stationary man-made objects that are at least partly immersed in water, such as an offshore drilling station, a lower resistance may lead to a reduced force exerted by moving water on the object, which would enable for example lighter designs of objects.

A large number of coatings are available, each providing its own fouling control characteristics. Choosing the appropriate coating, or combination of coatings, is essential for e.g. vessel owners in order to achieve the desired reduction of resistance for an extended period of time, preferably at least for the intended duration of an upcoming dry dock cycle.

As described in WO 2013/092681 a protective coating may be selected on the basis of fouling risks associated with regions where the vessel is expected to travel after the selected coating was applied. Whereas this method is useful, the applicant has found that room for improvement exists.

EP 1484700 A relates to a method for determining the costs associated with the application and use of a foul release or antifouling coating composition on the underwater section of a vessel. The method described in this document requires determination or calculation of the extent of fouling of the underwater surface of a vessel, and correlates predicted additional fuel costs of the vessel to the extent of fouling. A drawback of the method described in this document is that the precision and accuracy of the predicted additional fuel costs is not very high. The ability of this method to reliably identify the optimum combination of substrate preparation and foul control coating choice for any particular vessel is therefore low. Accordingly, there is need for an improved and more precise and accurate method.

SUMMARY

It is an object of the present invention to disclose a new and improved method to apply a coating to an external surface of a man-made object to be at least partly immersed in water.

One aspect of the disclosure pertains to a method of applying a coating to an external surface of a man-made object to be at least partly immersed in water (e.g. a vessel or an offshore drilling station) for a time period wherein there is water-flow over the immersed surface of the object. The applied coating has a minimal resistance rating for a set of at least two coatings.

The method comprises a computer-implemented coating selection process, which comprises a first step of obtaining, for each coating in the set of coatings, a total roughness value of the external surface based on a fouling roughness value, a macro roughness value and a micro roughness value associated with each coating.

It should be appreciated that a fouling roughness value may relate to a roughness associated with the settlement of marine fouling organisms. The fouling roughness value throughout the invention is not an actual physical measure of marine fouling organism roughness but rather is a measure of the effective physical roughness that would have the same impact on drag and flow structure as the fouling from a point of view of hydrodynamics.

It should also be appreciated that a macro-roughness value may primarily relate to roughness elements originating from elements of the external surface of the object, such as plate waviness, plate laps, weld seams, bolts or other protrusions, steel profile, corrosion of or damage to the object and roughness elements originating from the substrate preparation and paint application process such as coating roughness and coating defects, such as runs, sags, and overspray.

It should also be appreciated that a micro roughness value relates to roughness below the macro roughness value. It may primarily relate to roughness elements originating from the surface of the coating material The coating selection process comprises in a second step selecting a coating from the set of coatings, wherein the selected coating has a minimal resistance rating associated with the obtained total roughness value for the time period.

The method further comprises applying the selected coating to the external surface of the man-made object.

The method may involve the measurement or estimation of parameters relating to the fouling roughness value, the macro roughness value and/or the micro-scale roughness value. Examples of the parameters that may be measured or estimated in relation to the fouling roughness value are the types, distribution, density and rates of growth of biofouling on the coating over the time period.

Examples of the parameters that may be measured or estimated in relation to the macro roughness value relate to amplitude, spatial and hybrid parameters (combination of amplitude and spatial parameters) per cut-off length. Suitably $Rt_{50}$ (i.e. the greatest peak to trough height at 50 mm cut off length) is a measure of the macro roughness values as measured by a stylus probe profilometer, laser profilometer or white/blue light interferometer etc. Measurements may be carried out on the underwater hull area during dockings (newbuild and maintenance and repair). For in-dock surveys fouling roughness is suitably removed using a high pressure freshwater wash prior to measurement of the macro roughness values. Obvious areas, such as extensive mechanical damage, if present, may be excluded from the survey.

Examples of the parameters that may be measured or estimated in relation to the micro roughness value relate to amplitude, spatial and hybrid parameters (combination of amplitude and spatial parameters) per cut-off length. Suitably $Ra_5$ (i.e. the arithmetic average of the absolute values of the profile height deviations from the mean line, recorded within the evaluation length at 5 mm cut off length) can be used to measure the micro roughness values. Alternatively surface imprints can be generated on the underwater hull area during dockings (newbuild and maintenance and repair) and later reviewed in the laboratory. Measurement can be done using a stylus probe profilometer, laser profilometry, or white/blue light interferometer.

The measured or estimated parameters relating to the fouling roughness value, the macro roughness value and the micro roughness value may then all be expressed in terms of a common parameter which enables a simple addition of the three parameters to arrive at the total roughness value. For example, the fouling roughness value, the macro roughness value and the micro roughness value may be expressed as an equivalent sandgrain roughness height, $k_s$. The equivalent sandgrain roughness height for a specific roughness is the height of uniform, closely-packed sands which give the same roughness function as the specific roughness in a fully-developed turbulent flow regime.

The applicant has recognized that when applying a coating, a plurality of parameters should be taken into account and that the total roughness value of the external surface of a man-made object should be calculated based on a fouling roughness value, a macro roughness value and a micro roughness value. Furthermore, the applicant has realized that each specific coating influences the fouling roughness value, the macro roughness value and the micro roughness value in a specific way. It may for example be that a first coating has a very positive effect on the fouling roughness value, but a very negative effect on the macro roughness value and micro roughness value, possibly resulting in an overall negative effect on the total roughness value. Whereas for example a second coating may have a moderate positive effect on the fouling roughness value, macro roughness value and micro roughness value, possibly resulting in an overall positive effect on the total roughness value of the external surface. In this example the second coating would be the best option. In one embodiment, the costs of the coating material and the costs of application are additionally taken into account in the selection process. More in particular, the coating having the lowest total roughness value would only be selected if the expected benefits in terms of longer service intervals and/or fuel savings would outweigh any higher costs related to that coating material or its application. The man-made object to be at least partly immersed in water may be a vessel such as a ship, boat or other watercraft that is expected to move through the water for at least some of the time, or a static structure to be at least partly immersed in water, such as an offshore drilling station that is expected to be substantially stationary.

It should be appreciated that the term "coating" may refer to a coating substance but the term may also refer to a technology used to apply a coating, or to a coating scheme. For example, it may be that the set of coatings comprises two identical coating substances applied using two different technologies. A coating may also comprise multiple layers prepared from different coating compositions The time period may be any suitable time period, for example a dry-dock cycle for a vessel, that is the period between launch of a vessel and its first dry-docking or between subsequent dry-dockings. The time period may be, for example three years, or five years or may be shorter or longer.

It should be appreciated that at least one of the fouling roughness value, the macro roughness value and the micro roughness value may be time-dependent and change over the time period. The calculated total roughness value of the external surface may also therefore be time-dependent and change over the time period. The calculated total roughness value, as well as the fouling roughness value, the macro roughness value and the micro roughness value, may comprise a plurality of values, wherein each value is associated with a particular time or time span in the time period. As an example, the calculated total roughness value may be plotted as a curve on a graph with on the vertical axis the values of the total roughness value and time on the horizontal axis.

It should further be appreciated that based on each total roughness value, obtained for each coating in the set of coatings, an associated resistance rating may be calculated, yielding a set of resistance ratings. The minimal resistance rating of the selected coating may be the lowest resistance rating in the set of resistance ratings.

The minimal resistance rating may indicate a drag resistance of a vessel as it moves through water. The minimal resistance rating may also indicate a frictional force that a stationary object at least partly immersed in water experiences from the movement of water over the immersed surface of the object.

In an embodiment disclosed herein, a calculation of the fouling roughness value associated with each coating may comprise the following steps. A first step involves accessing a roughness database that associates a combination of each coating and at least one geographical region where the man-made object is expected to be located during the time period with a static fouling roughness value.

Biofouling that settles under dynamic conditions, as a result of the constant or periodic application of a shear force (for example, the flow of water greater than about 5 knots), yields less biofouling accumulation, smoother surfaces and a lower fouling roughness value. For this reason, a roughness adjustment factor is introduced to account for fouling roughness value differences between static and dynamic growth. The adjustment factor is a simple multiplication factor that modifies the fouling roughness value.

The static fouling roughness value is the fouling roughness value resulting when the coated object is subject to a constant or periodic shear force (for example, the flow of water less than about 5 knots). Correspondingly, a dynamic fouling roughness value is the fouling roughness value resulting when the coated object is subject to a constant or periodic application of a shear force (for example, the flow of water greater than about 5 knots). Fouling that settles under dynamic conditions, yields less fouling accumulation, smoother surfaces and a lower fouling roughness values. For this reason, a fouling roughness value adjustment factor is introduced to account for fouling roughness value differences between static and dynamic conditions. The adjustment factor is a mathematical factor that modifies the fouling roughness value. A second step involves retrieving the static fouling roughness value from the database. A third step comprises converting the static fouling roughness value to a dynamic fouling roughness value by accounting for an expected activity of the man-made object during the time period. A fourth step involves calculating the fouling roughness value based on the dynamic fouling roughness value.

It should be appreciated that the roughness database may comprise a plurality of coatings and a plurality of geographical regions, and the roughness database may comprise a separate static fouling roughness value for each unique combination of coating and geographical region as disclosed in WO 2013/092681, page 8, line 22, to page 9, line 29. The roughness database may further comprise empirical data. The roughness database may further comprise calculated data. The calculated data may be interpolated data.

The geographical region(s) where the man-made object is expected to travel, be located in or contact during the time period may comprise a trading route that a vessel is expected to sail on during the time period.

Accounting for the expected activity of the man-made object may comprise the use of an activity factor based on an expected activity. The expected activity may comprise a ratio between a time duration that a vessel is expected to sail and a time duration that a vessel is expected to be stationary. The activity factor may be selected to reflect the risk that a stationary object may ordinarily foul to a greater extent than a moving object and the stationary object may therefore have a higher fouling roughness value. For a stationary object, such as an offshore drilling station, the dynamic fouling roughness value may be equal to the static fouling roughness value.

The static fouling roughness value may be one value representing the expected static fouling roughness value at one particular time, wherein the particular time may be at the end of the time period. For example, it may be that a vessel is expected to sail through geographical region I, and that a coating B is in the set of coatings, and that the time period is a dry dock cycle of five years. The static fouling roughness value associated with the combination I and B may then represent the expected static fouling roughness value at the end of the five year period.

The dynamic fouling roughness value may also comprise one value representing the dynamic fouling roughness value at one particular time. Calculating the fouling roughness value based on the dynamic fouling roughness value may comprise calculating a plurality of values of the fouling roughness based on an expected change in the fouling roughness with time. The immersed surface of an object may foul to a greater extent depending on the immersion period. Ordinarily, the risk of the object fouling will increase with longer immersion periods such that object that have been immersed for longer periods may have higher fouling roughness value. For example, the predicted change in the fouling roughness value with time may be that the fouling roughness value increases exponentially with time. Alternatively, the expected change in the fouling roughness value with time may be that the fouling roughness value increases linearly, step-wise or logarithmically with time.

The embodiment enables accounting for an expected activity of the man-made object during the time period. Much less fouling may be expected for a man-made object at about 100% activity, for example a vessel that is sailing most of the time, than for a man-made object at about 0% activity, for example a vessel that lies still most of the time or a stationary object. Furthermore, by applying the predicted change in the fouling roughness value with time, the fouling roughness value may be calculated for any time in the time period based on the dynamic fouling roughness value and hence enables selecting a coating using a calculation of a plurality of values of the fouling roughness value over time, wherein each value of the plurality of values represents the fouling roughness at a particular time in the time period.

In another disclosed embodiment, at least one static fouling roughness value associated with a combination of a coating in the set of coatings and the geographical region has been derived. A first step involves retrieving from a fouling database parameters relating to fouling of a plurality of man-made objects to be at least partly immersed in water that have been in the geographical region and to which the coating was applied. A second step involves calculating a fouling score based on the parameters for each man-made object in the plurality of man-made objects, yielding fouling scores. A third step involves calculating a representative value of the fouling scores. A fourth step comprises obtaining the static fouling roughness value from a table associating the calculated representative value of the fouling scores with the static fouling roughness values.

The parameters relating to fouling of the plurality of man-made objects to be at least partly immersed in water may have been measured on man-made objects during a selected period such as a dry dock cycle for a vessel. The parameters relating to fouling may comprise a number of sub-categories to account for the extent and severity of different types of fouling growth that may be present on an immersed surface. For example, these sub-categories may include at least one of a percentage of coverage of the external surface with light slime, a percentage of coverage of the external surface with medium slime, a percentage of coverage of the external surface with heavy slime, a percentage of coverage of the external surface with weed, a percentage of coverage of the external surface with light animal fouling, a percentage of coverage of the external surface with heavy animal fouling.

It should be appreciated that calculating a representative value of the fouling scores may involve calculating an arithmetic average of the fouling scores. It may also involve calculating a weighted average, or any other type of mean, such as a median, a cubic mean, or a midrange or modal value.

The embodiment enables, for each coating in the set of coatings, the use of numerous historical measurements of parameters relating to fouling of man-made objects that have been immersed in water in the geographical region. Founding the static fouling roughness value on these actual measurements enables better results.

In an embodiment the plurality of man-made objects is divided into at least two subgroups. Each of the at least two subgroups is associated with a respective range of fouling scores. The respective ranges do not overlap and each subgroup comprises only man-made objects that have fouling scores within the respective range of each subgroup. For each subgroup a separate representative value is calculated, and subsequently a separate static fouling roughness value, a separate dynamic fouling roughness value, a separate fouling roughness value and a separate total roughness value are calculated.

It may be that the plurality of man-made objects is divided into three subgroups. The first subgroup may, for example, comprise 70 percent of the plurality of man-made objects, wherein each man-made object in the first subgroup has a lower fouling score than each man-made object in the second and third subgroup. The second subgroup may, for example, comprise 20 percent of the plurality of man-made objects, wherein the man-made objects in the second subgroup each have a higher fouling score than each man-made object in the first subgroup, and each man-made object in the second subgroup has a lower fouling score than each man-made object in the third subgroup. The third subgroup may comprise, for example, 10 percent of the plurality of man-made objects, wherein each man-made object in the third subgroup has a higher fouling score than each man-made object in the second subgroup.

The embodiment enables an improved derivation of the static fouling roughness value by distinguishing between the three different subgroups. It prevents a skew of the calculated representative value of the fouling scores towards higher values that may be caused by a few man-made objects associated with very high fouling scores. Also the embodiment enables the calculation of three resistance ratings for each coating.

In one embodiment the macro roughness value is derived by calculating a macro roughness score based on at least one of an initial substrate macro roughness score, a coating macro roughness score, and a time-dependent macro roughness score. The initial substrate macro roughness score may depend on a preparation of the external surface prior to applying the coating. For the maintenance and repair of steel objects such as ships and vessels, it is common practice for the external surface of the hull to be prepared for application of a coating by techniques such as scraping, power-tooling, low or high pressure water-washing, hydroblasting or abrasive blasting to be performed on in preparation for re-coating. The preparation of the external surface may comprise a "full blast", wherein all coating layers of the entire external surface to be immersed are removed by abrasive blasting and the bare external surface is uncovered. The preparation may also be a "partial blast", wherein only the coating layers of selected areas of the external surface, for example areas where the existing coating is in poor condition, are removed and wherein the bare external surface is uncovered only in these selected areas. It should be appreciated that the preparation of the external surface may also be a percentage of the external surface that is treated by abrasive blasting. For example, two partial blast treatments, wherein the selected areas in one treatment constitute 50% of the total external surface and wherein the selected areas in the other treatment constitutes 70% of the total external surface, may be considered as two different preparations. The preparation may also be that the external surface is not treated by abrasive blasting. For newly built vessels, it is common practice for the external surface of the hull to be fully blasted in preparation for coating. The coating macro roughness score and the time-dependent macro roughness score may depend on the coating product that is to be applied to the object. Different coating macro roughness scores and time-dependent macro roughness scores may be selected for different individual coating products. Alternatively, different coating products may be categorized according to different generic technology classifications. Fouling control coatings may, for example, be categorized as at least one of Foul Release, Biocidal Foul Release, Self Polishing Copolymer (SPC), Linear Polishing Polymer (LPP), Self Polishing (SP), Controlled Depletion Polymer (CDP), Ablative, Self Polishing Hybrids (SPH), hydrolyzing, ion-exchange, or another coating technology.

The embodiment enables the distinction between different contributing factors to the macro roughness score, wherein each contributing factor may be different for each coating.

In one embodiment the micro roughness value is derived by calculating a micro roughness score based on an initial micro roughness score and a time-dependent micro roughness score, and by calculating the micro roughness value based on the micro roughness score. The initial micro roughness score and the time-dependent micro roughness score may be derived from measurements performed in a laboratory. The initial micro roughness score may be measured by a variety of techniques such as a stylus probe profilometer, laser profilometer or white/blue light interferometry to characterize the surface roughness in 2 or 3 dimensions. These measurements can build up details regarding the nature of surface features, such as amplitude, wavelength etc. The time dependent micro-scale score may be measured by, for example, exposure of the coating surface to flowing seawater using a flume, disc rotor, drum rotor or other technique and periodically measuring the change in micro-roughness for the coating surface.

The embodiment enables the use of laboratory measurements in the calculation of the micro roughness values of the hull.

In one embodiment the external surface is segmented in at least two segments. And the total roughness value of the external surface is a combination of the total roughness value of a first segment and the total roughness value of a second segment.

The combination may be an addition, wherein the total roughness value of each segment is weighted with a segment specific factor. It may be that the sum of the segment specific factors is equal to 1. The values of the segment specific factors may reflect the approximate relative surface areas of each segment and may differ per man-made object to be at least partly immersed in water. The embodiment enables the separate calculation of a total roughness value of each segment of the external surface.

In another embodiment the external immersed surface, for example of a ship hull, is segmented into areas. Examples of areas include a Boot Top part, a Vertical Side part and a Flat Bottom part, a Bow part, a Shoulders part, a Stern part, a propeller part or other part of the hull. In a preferred embodiment, the external immersed surface of a ship hull is segmented into areas selected from a Boot Top part, a Vertical Side part and a Flat Bottom part.

The total roughness value of the hull may be a combination of a total roughness values for each segment of the hull, for example a combination of a total roughness value of the Boot Top part, a total roughness value of the Vertical Side part and a total roughness value of the Flat Bottom part. The combination may be an addition, wherein the roughness of each segment of the hull is weighted with a factor, for example the Boot Top part is weighted with a Boot Top factor, the roughness of the Vertical Side part is weighted with a Vertical Side factor, and the roughness of the Flat Bottom part is weighted with a Flat Bottom factor. The embodiment enables the separate calculation of a roughness of each part of the hull.

In one embodiment the minimal resistance rating is calculated by a Computational Fluid Dynamics model based on at least one of the total roughness value, a shape and size of the man-made object, and an operational speed of the man-made object. The embodiment enables a sophisticated derivation of the resistance rating associated with the obtained roughness during the time period. The operational speed of the object may vary with time. Suitably, an average operational speed is used, or a more detailed speed profile.

In one embodiment the selected coating is configured to protect against one of fouling, corrosion, solid and liquid particle abrasion, deterioration as a result of UV absorbance and ice. The embodiment enables applying different types of coatings.

In another embodiment the external surface of the man-made object to be at least partly immersed in water comprises a hull of a vessel.

When the fouling roughness value exceeds a certain threshold value, the overall roughness value may be dominated by the fouling roughness value. In such cases, the changes in macro roughness value or micro roughness value may be ignored.

The method of the invention is also very suitable to predict power requirement, fuel consumption and green-house gas emissions of a vessel hull coated with a selected coating. This enables vessel operators to accurately predict economic advantages caused by selection of a specific coating. Therefore, in a preferred embodiment the power requirement to move a vessel at a desired speed is calculated for the vessel hull coated with the selected coating. The total roughness value can be correlated to a drag resistance of a specific vessel having a specific hull shape and size, which in turn can be correlated to power requirement at a desired vessel speed. These data can, for example, be extracted from a database containing historic or calculated power requirement and drag resistance data for a specific vessel. In a further embodiment, the power requirement is converted into predicted fuel consumption. In cases where the vessel is powered by fossil fuel, it is possible to correlate the selection of a specific coating with green-house gas emissions.

Other aspects of the disclosure pertain to a computer program and non-transitory computer-readable storage medium for use in the method.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java(TM), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Embodiments of the present invention will be further illustrated with reference to the attached drawings, which schematically will show embodiments according to the invention. It will be understood that the present invention is not in any way restricted to these specific embodiments.

It is noted that the invention relates to all possible combinations of features recited in the claims.

BRIEF DESCRIPTION OF THE DRAWINGS

Aspects of the invention will be explained in greater detail by reference to exemplary embodiments shown in the drawings, in which:

FIG. 4 is a flow diagram depicting the derivation of the macro-scale roughness.

FIG. 5 is a flow diagram depicting the derivation of the micro-scale roughness.

FIG. 7 depicts an example of a roughness database.

FIG. 8 depicts an example of a fouling database.

FIG. 9 depicts an example of a table.

DETAILED DESCRIPTION OF THE FIGURES

Figure 1:
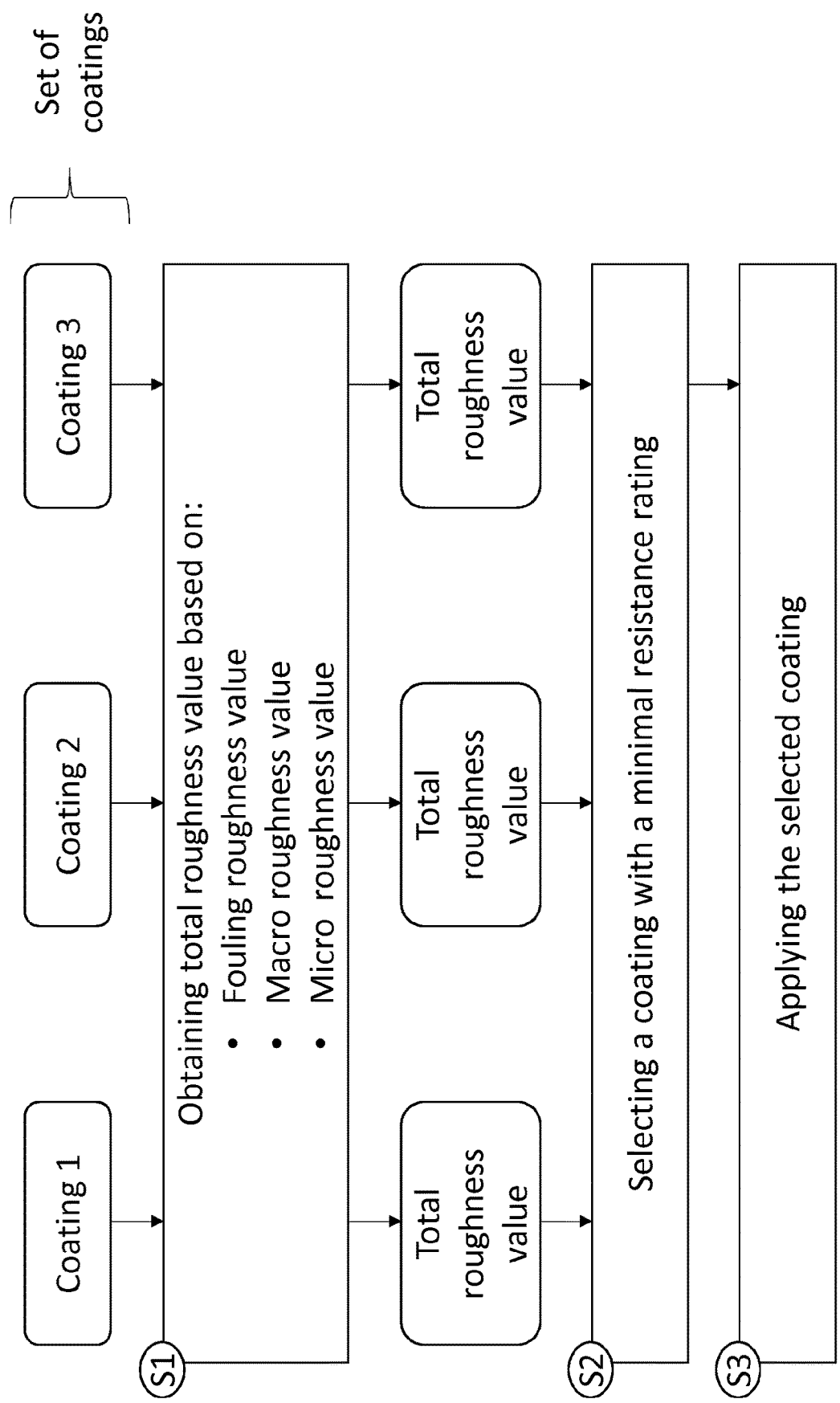
FIG. 1 is a flow diagram depicting steps of the disclosed method.

FIG. 1 shows a schematic flow diagram of an embodiment of the disclosed method. Herein the set of coatings comprises three different coatings, coating 1, coating 2 and coating 3. For each coating a total roughness value of an external surface is obtained in step S1. Obtaining this total roughness value involves a fouling roughness value, a macro roughness value and a micro roughness value. Step S1 yields for each coating 1-3 a total roughness value. A resistance rating is associated with each total roughness value and in step S2 the coating with the minimal resistance rating is selected. In this embodiment coating 3 has the total roughness value that is associated with the minimal resistance rating. Subsequently in step S3, the selected coating, coating 3, is applied to an external surface of a man-made object to be at least partly immersed in water.

Figure 2:
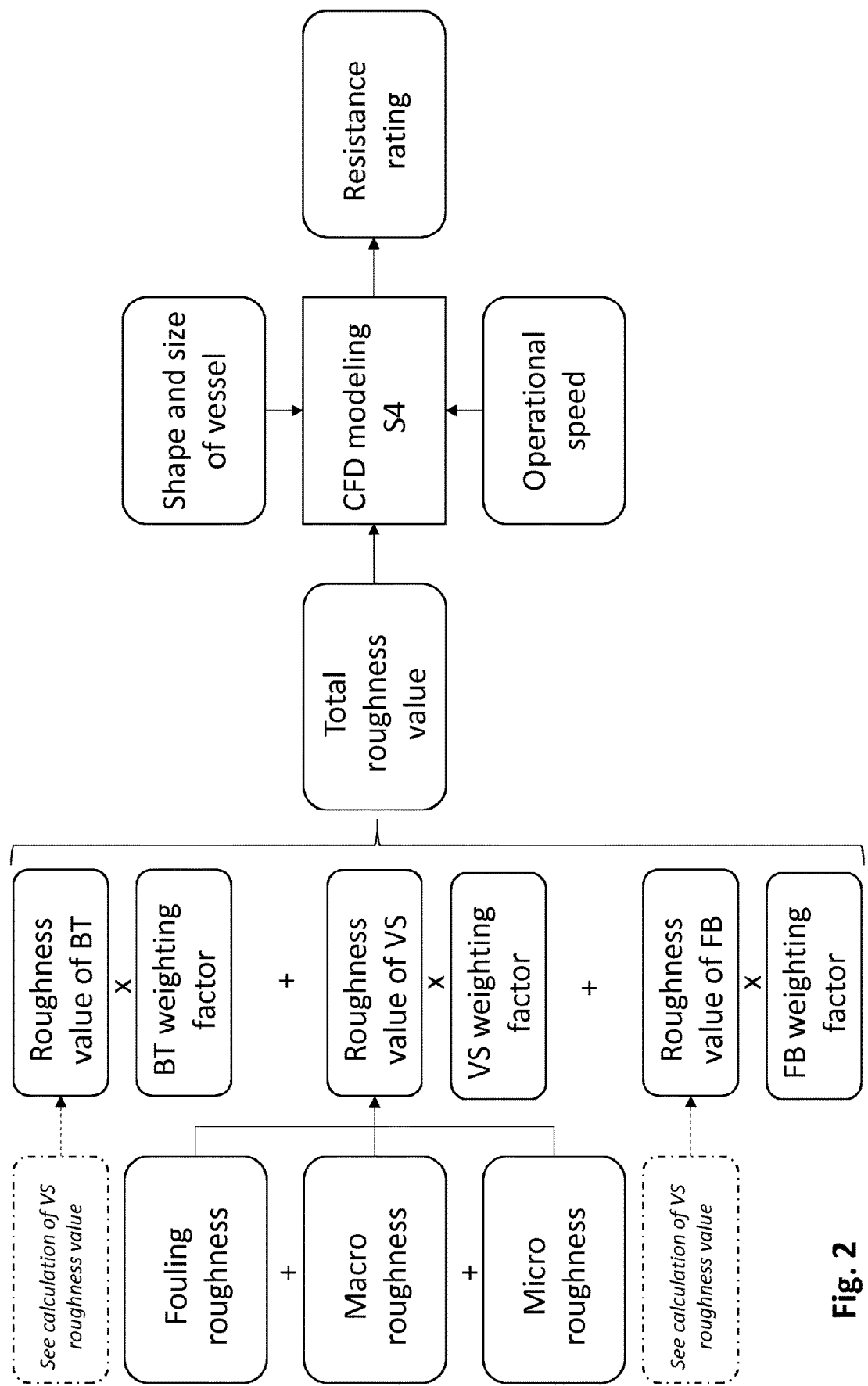
FIG. 2 is a flow diagram depicting the derivation of a resistance rating.

FIG. 2 is a flow diagram depicting for one embodiment the derivation of the resistance rating for a coating. In this embodiment the external surface of the man-made object to be at least partly immersed in water is a hull of a ship. It should be appreciated that the same derivation steps may be used for other man-made objects to be at least partly immersed in water, such as an offshore drilling station. Looking at the right hand side of FIG. 2, it can be seen that the resistance rating is a result of a Computational Fluid Dynamics (CFD) modeling step S4. Inputs that are used for this modeling are the shape and size of the vessel, an operational speed of the vessel and the total roughness value of the external surface. The CFD modeling in step S4 provides the resistance rating associated with the total roughness value. In addition, and based on the total roughness value, the CFD modeling may predict the power consumption of a vessel in the time period (not shown). Subsequently, other parameters based on this power consumption may be calculated, such as fuel consumption, fuel costs, amount of emitted greenhouse gases, etcetera.

In the embodiment of FIG. 2, the hull of the vessel is segmented into three segments: a boot top (BT) segment, which is the area of the hull between the water lines of the vessel when fully loaded and when unloaded, a vertical side (VS) segment, which vertical, curved or sloping area from the bilge to the bottom of the boot top segment, and a flat bottom (FB) segment, which is the bottom area of the hull from bilge to bilge. Typically, the bilge is the rounded portion of the hull forming the transition between the bottom and the vertical sides. As shown in FIG. 2, the total roughness value may be calculated by combining a total roughness value of the boot top segment, a total roughness value of the vertical side segment and a total roughness value of the flat bottom segment, and weighing each total roughness value with a specific weighting factor.

FIG. 2 shows an embodiment where the total roughness value of the VS segment is obtained based on the fouling roughness value (of the VS segment), the macro roughness value (of the VS segment), and based on the micro roughness value (of the VS segment). It should be understood that the total roughness value of the BT segment and the total roughness value of the FB segment may also be obtained based on the fouling roughness values, macro roughness values and micro-roughness values of the BT segment and the FB segment respectively. It should be appreciated that the fouling roughness value, the macro roughness value and the micro roughness value may all be expressed in terms of an equivalent sandgrain roughness height, $k_s$, which enables a simple addition of the three parameters to arrive at the total roughness value. The equivalent sandgrain roughness height for a specific roughness value is the height of uniform, closely-packed sands which give the same roughness function as the specific roughness in a fully rough flow regime.

Figure 3:
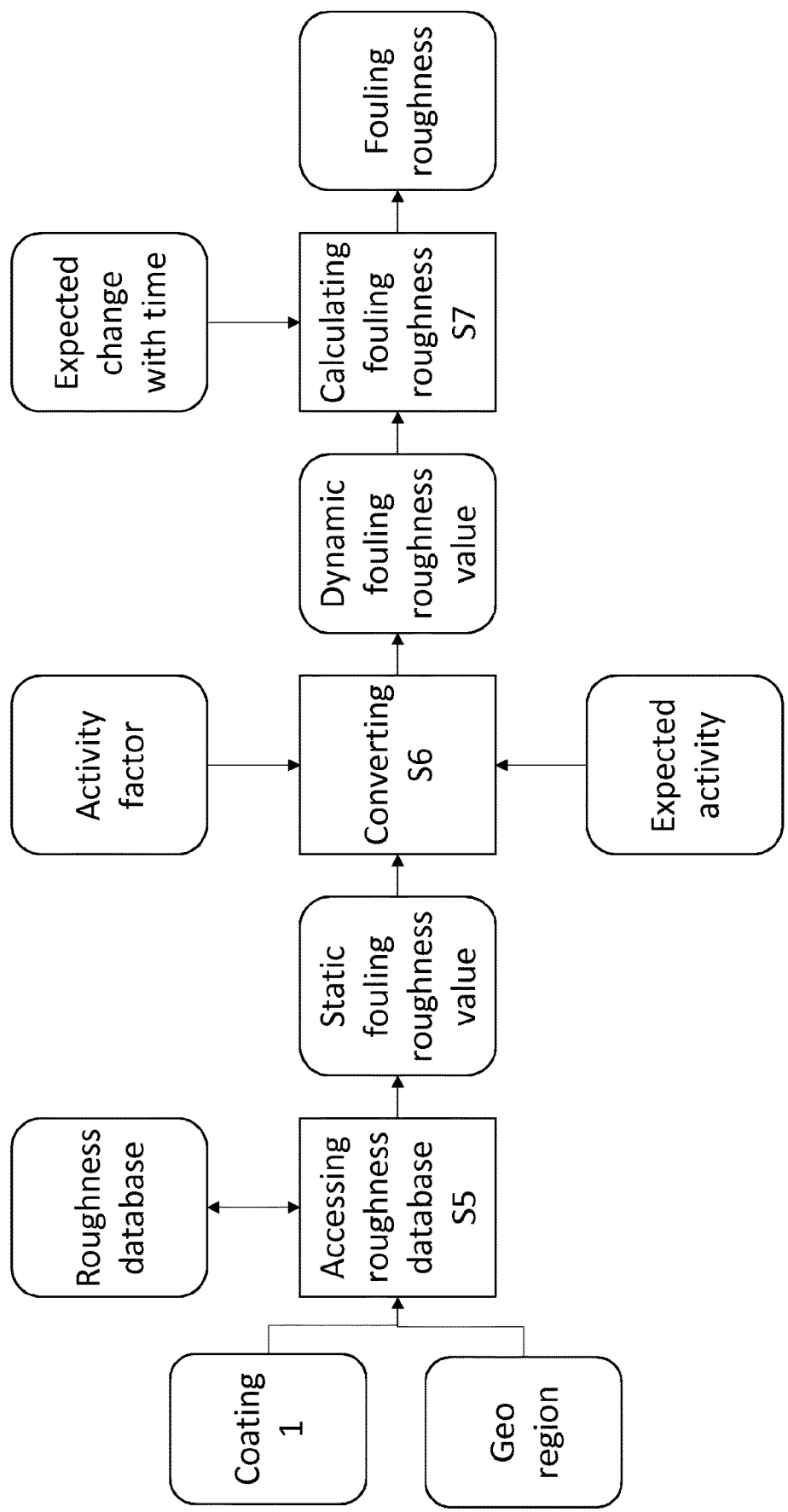
FIG. 3 is a flow diagram depicting the calculation of the fouling roughness.

FIG. 3 is a flow diagram depicting the calculation of the fouling roughness value in one embodiment, that is associated with coating 1, depicted on the left hand side of FIG. 3. Further note that the Geo region in the figure, is the geographical region where a man-made object to be at least partly immersed in water is expected to be located during the time period. It may be that the man-made object is a container vessel that has a three year dry dock cycle. It may further be that the container vessel is scheduled to only sail between the ports of Boston, United States and Rotterdam, The Netherlands during the upcoming three years. The geographical region may then be the North Atlantic Ocean. Coating 1 and Geo region are the inputs in the depicted calculation of the fouling roughness. In step S5 a roughness database is accessed and from the roughness database a static fouling roughness value is retrieved that is associated with the combination of coating 1 and Geo region. It should be appreciated that the roughness database is an important aspect in calculating the fouling roughness value and thus in performing the disclosed method. A more detailed description of the generation of the roughness database is provided below with respect to FIG. 6.

After the static fouling roughness value has been obtained, in step S6 it is converted to a dynamic fouling roughness value. This conversion is based on an activity factor and an expected activity. The activity factor may reflect the risk that a vessel at 0% activity will foul more severely than a vessel at 100% activity. The expected activity may indicate a ratio between the time that a vessel is sailing, and the time that a vessel is lying still in the water. Hereby the activity of the vessel is accounted for in the calculation of the fouling roughness. Generally a vessel that is sailing most of the time is at lower risk of fouling settlement than a vessel that is lying still most of the time. After the dynamic fouling roughness value has been obtained, in step S7, the fouling roughness value is calculated. In this last step S7 an expected change with time of the fouling roughness value is taken into account. The dynamic fouling roughness value may be one value indicating one particular value of the fouling roughness at the end of a time period, such as a dry dock cycle. By basing the calculation S7 of the fouling roughness value on an expected change with time, a plurality of values of the fouling roughness values may be calculated, e.g. one value for each particular time in the time period. The expected change with time may be, as described above, an exponential increase of the fouling roughness value with time.

FIG. 4 is a flow diagram depicting the derivation of the macro roughness value in one embodiment. Inputs for this derivation are an initial substrate macro roughness score, a coating macro roughness score and a time dependent macro roughness score. A macro roughness score is calculated based on these parameters in a calculating step S8. In a further step S9, the macro roughness score is converted into a macro-roughness value. The initial macro roughness score may be dictated mainly by the profile of the external surface. Hence the preparation of the external surface prior to applying the coating is an important parameter in estimating the initial macro roughness score. Furthermore, research has shown that the coating product and/or the coating technology classification has an impact on the initial macro roughness score. Hence, the coating product or coating technology classification is also taken into account in the coating roughness score. The change in the macro roughness score during a dry dock cycle is determined by the time dependent macro roughness score and may be assumed to be a linear increase.

FIG. 5 is a flow diagram depicting the derivation of the micro roughness value. The derivation is based on an initial micro roughness score, and a time-dependent micro roughness score. A micro roughness score is calculated in a step S10, and subsequently the micro roughness value is derived in step S11. Numerous factors have an impact on the initial micro roughness value, such as application method/quality, batch age of the coating, etc. Therefore, it is desirable that the initial micro roughness value is derived from numerous replicate measurements of coating surfaces.

Figure 6:
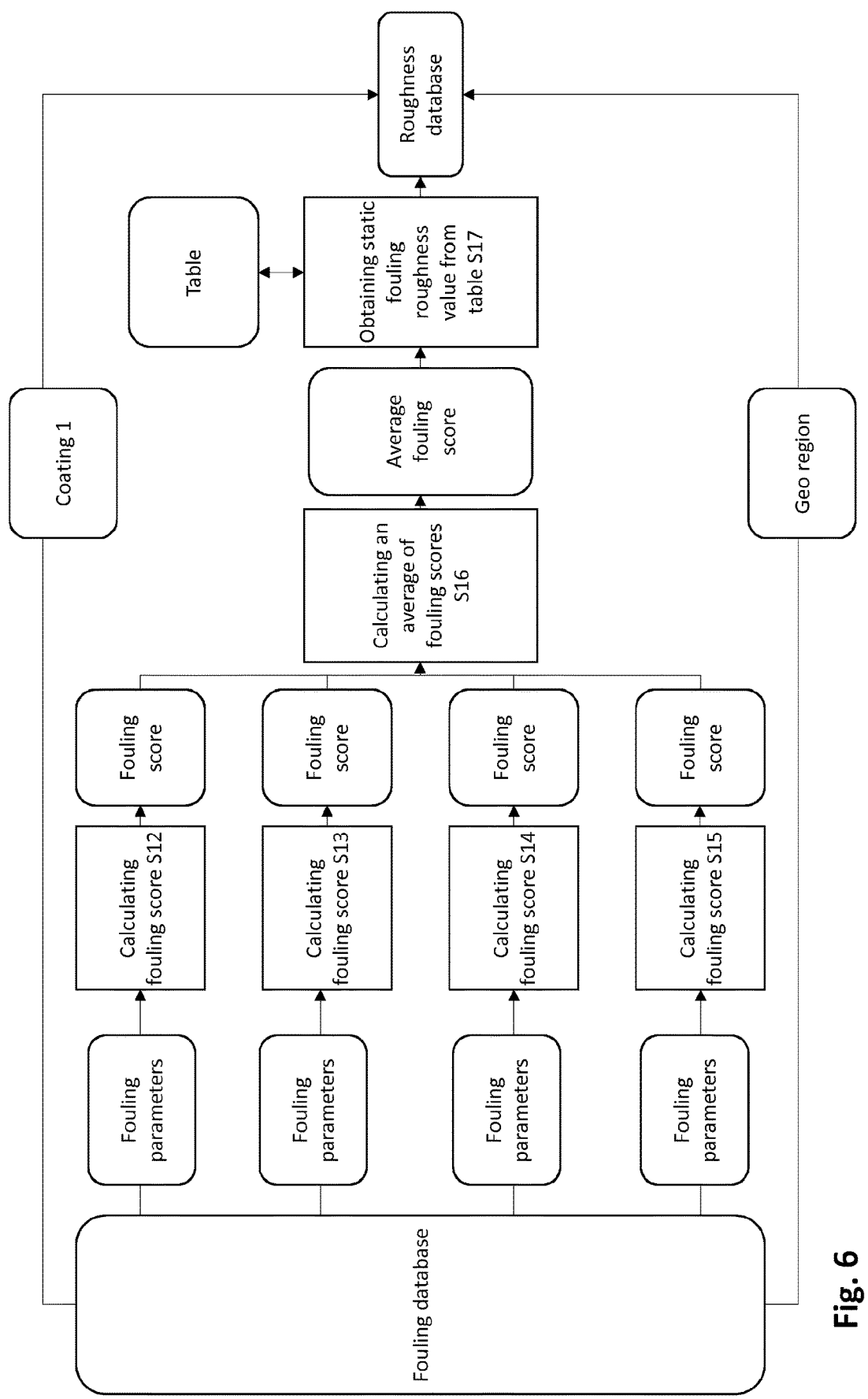
FIG. 6 is a flow diagram depicting data-entry into a roughness database.

FIG. 6 is a flow diagram of the generation of an entry in the roughness database. The roughness database comprises, as described with reference to FIG. 3, a static fouling roughness value for the combination of coating 1 and Geo region. Starting point for the generation of an entry is the fouling database. The fouling database may comprise data on fouling measurements performed on a plurality of vessels, for example over 20,000 vessels. These measurements may have been performed during dry docks of the vessels. The data may also comprise which coating had been applied to the vessels and which geographical regions the vessels have sailed through, as well as speed and activity data for the vessel over the dry-dock cycle period. FIG. 8 shows a possible extract of the fouling database, which will be explained in more detail below. In the embodiment of FIG. 6, the fouling database comprises fouling parameters obtained through respective fouling measurements on four different vessels (not shown), to which coating 1 was applied and that have sailed through Geo region. The fouling parameters for a vessel may indicate which type of fouling was found and its extent, expressed as a percentage of the external surface. For example, the fouling parameters of one vessel may indicate that 10% of the external surface of the vessel was covered with light slime, that 20% was covered with heavy slime, that another 5% was covered with weed and that another 10% of the external surface was covered with heavy animal fouling. Based on the fouling parameters in steps S12-S15 a fouling score is calculated for each vessel. These fouling scores are combined in step S16 to calculate an average fouling score. In a next step S17, the static fouling roughness value is obtained by accessing a table that associates a static fouling roughness value with the calculated average fouling score. Once the static fouling roughness value has been obtained in step S17, it is added, together with coating 1 and Geo region, to the roughness database. Hence the roughness database comprises one entry associating a static fouling roughness value with the combination of Coating 1 and Geo region.

FIG. 7 depicts an example of an extract of the roughness database in one embodiment. As can be seen, for each combination of coating and geographical region an associated static roughness value is present in the roughness database. The dependency of the static fouling roughness value on the geographical region may arise from different circumstances in each geographical region. These circumstances may for example relate to composition of the water, temperature of the water, or weather circumstances. Each coating may of course react different to these circumstances leading to different coating performances per geographical region. It could for example be that coating 1 prevents fouling more effectively than coating 2 in the Atlantic Ocean, but coating 2 prevents fouling more effectively than coating 1 under the different circumstances found in the Indian Ocean.

FIG. 8 depicts an example of an extract of a fouling database in one embodiment. Note that in this extract only the combination of coating 1 and geographical region "Atlantic Ocean" is present. Ten vessels are in this extract, ship A-J, that have all sailed through the Atlantic Ocean with coating 1 applied. The fouling parameters may have been measured during a dry dock cycle of each ship. Only two fouling parameters are shown here, the percentage of coverage of the hull with light slime, and the percentage of coverage of the hull with heavy slime. For each ship a fouling score has been calculated. Furthermore, the ships have been divided into subgroups, namely a subgroup with low fouling scores, Low, a subgroup with medium fouling scores, Medium, and a subgroup with high fouling scores, High. This enables the calculation of an average fouling score per subgroup and prevents a skew to high fouling scores, originating from one ship having a very high fouling score. In this embodiment, ship C with a fouling score of 8.3 would cause a skew to a higher value of the average fouling score.

It should be noted that each ship A-J, may have its own dry dock period, thus the time between application of coating 1 and measurement of the fouling parameters may have been different from ship to ship, which naturally influences the measured fouling parameters. Ships with longer dry dock cycle periods are generally at higher risk of fouling than ships with shorter dry-dock cycle periods. Furthermore, it may be that Ship J has been sailing much more than ship B (i.e. has had a higher activity), resulting in a lower fouling score for ship J. Such differences between the operating characteristics of the vessels in the fouling database are preferably taken into account as much as possible, for example by adjustment factors. The entries in the fouling database preferably take into account such differences in the operating characteristics of the vessels, for example by the application of adjustment factors, in order to arrive at a relevant average fouling score.

FIG. 9 is an illustrative example of a table, wherein static fouling roughness values are associated with a fouling score. The table may be based on scientific research.

Figure 10:
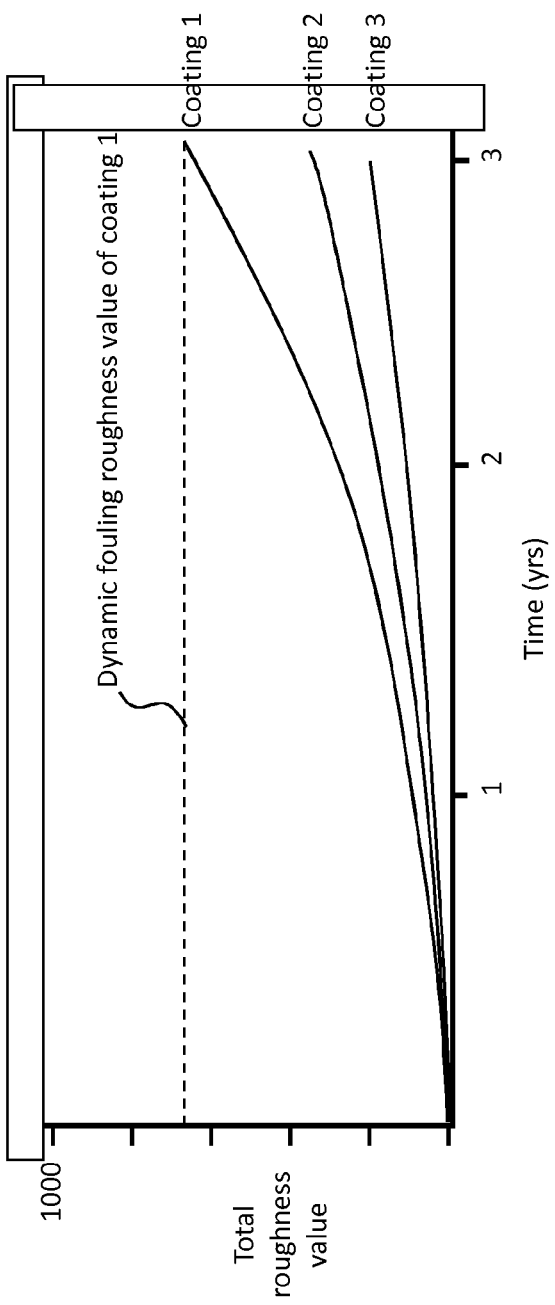
FIG. 10 is a diagram comprising three total roughness values.

FIG. 10 is a diagram depicting the respective total roughness values for coating 1, 2 and 3. The total roughness values are calculated for a period of three years. In this embodiment the values of the total roughness values at the end of this three year period are the respective dynamic fouling roughness values of coating 1, 2 and 3. In FIG. 10 the dynamic fouling roughness value of coating 1 is indicated by the dashed line. As explained above, based on each dynamic fouling roughness values the total roughness value curves have been calculated. In this embodiment, the expected change of the total roughness value with time was assumed to be an exponential increase, hence the exponential curves. As can be seen, due to these exponential increases, especially the total roughness values of the three coatings in the third year differ significantly. In general, higher total roughness values are associated with higher resistances, and thus for example with higher fuel costs for vessel owners.

Figure 11:
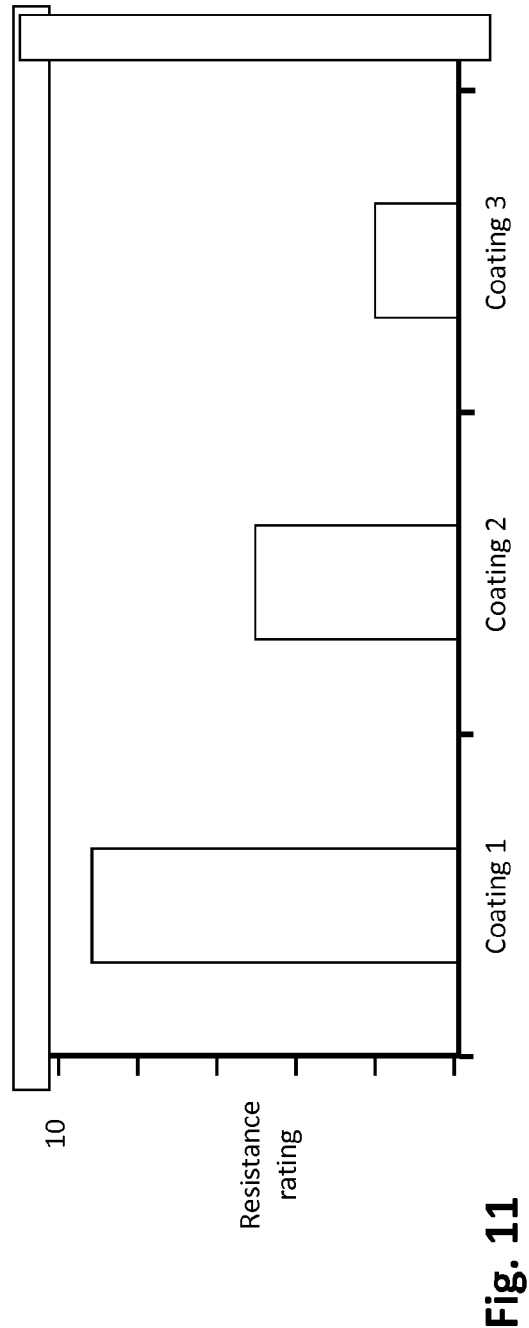
FIG. 11 is a diagram showing resistance ratings.

FIG. 11 is a diagram depicting the respective resistance ratings that are associated with the total roughness values shown in FIG. 10. The resistance rating is a result of CFD modeling that uses as input, among others, the total roughness value. As expected, the resistance rating for coating 3 is the minimal resistance rating in this embodiment. Calculation of the resistance rating based on the total roughness value may involve an integration of the total roughness value over the time period, in this case over the three year time period depicted in FIG. 10. It should be appreciated that the resistance rating of for example a vessel may be an indication of the fuel costs for the vessel owner for the upcoming dry dock cycle.

Figure 12:
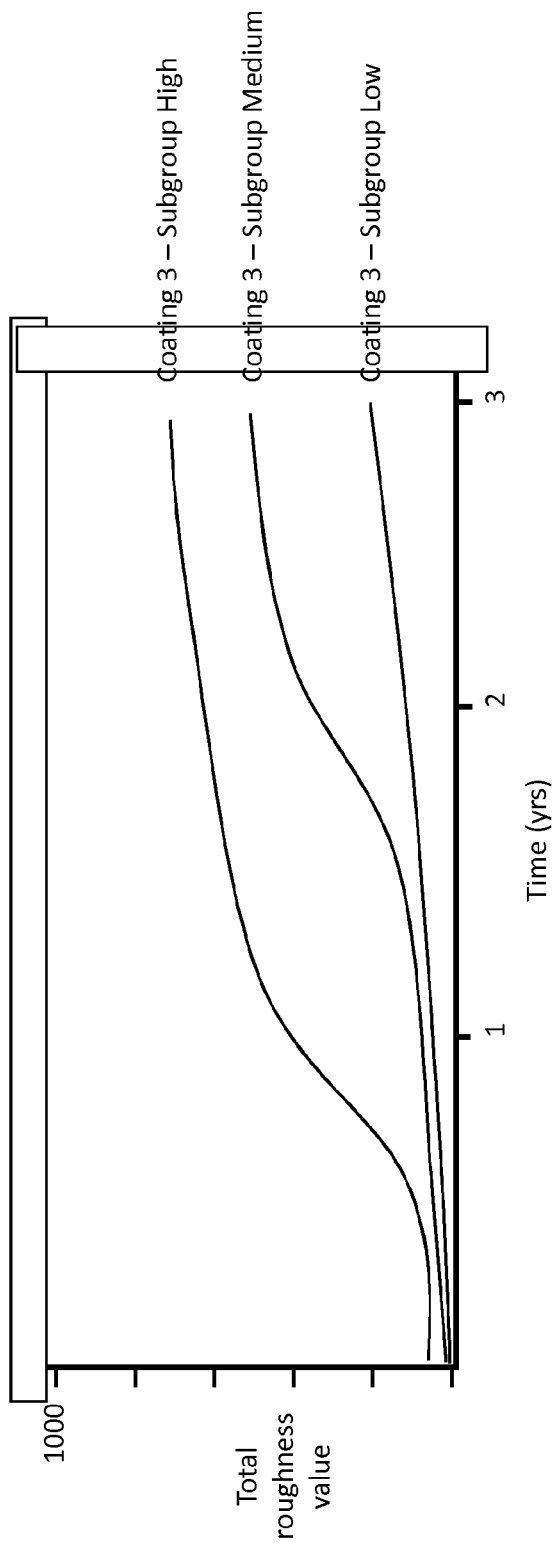
FIG. 12 is a diagram showing three total roughness values.

FIG. 12 shows an example of resistance ratings for coating 3 wherein the vessels in the fouling database have been divided into three subgroups and wherein three average fouling scores have been obtained and subsequently three static fouling roughness values, three dynamic fouling roughness values, three fouling roughness values, three total roughness values and finally three resistance ratings, one for each subgroup. It may be that the subgroup High comprises the 10% of the vessels in the fouling database with the highest fouling scores, the subgroup Medium comprises 20 percent of the vessels with medium fouling scores, and the subgroup Low comprises 70% of the vessels in the fouling database with the lowest fouling scores. As such, the three curves in FIG. 12 may indicate a likelihood of different levels of total roughness values occurring for coating 3. The curve of subgroup Low is then the main prediction and represents the probable or expected total roughness value. The curve of subgroup Medium then represents a possible total roughness value, yet somewhat more unlikely than the total roughness value associated with subgroup Low. The curve of subgroup High represents an unlikely total roughness value.

Figure 13:
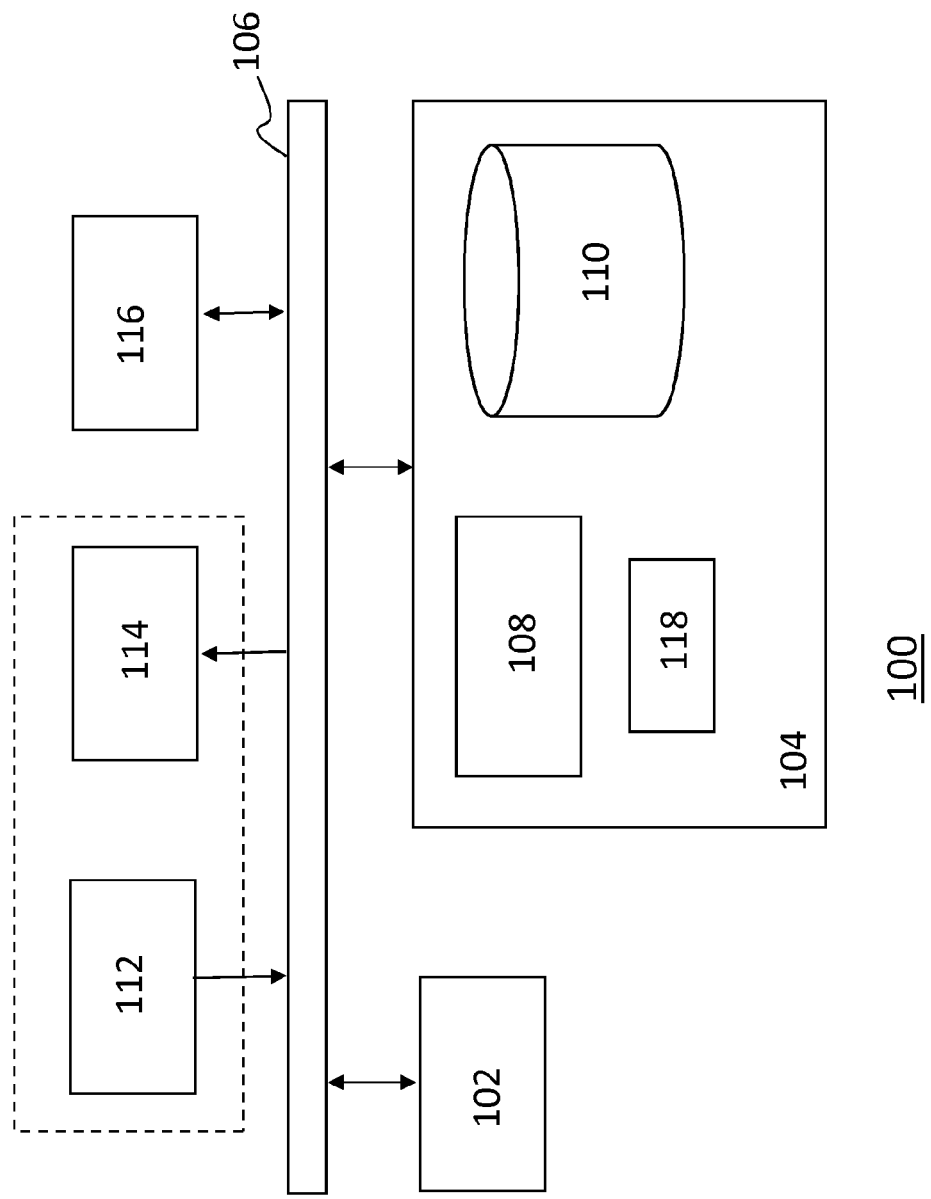
FIG. 13 depicts a computing system, according to one embodiment of the present invention.

FIG. 13 depicts a block diagram illustrating an exemplary data processing system that may be used in the computer-implemented coating selection process.

As shown in FIG. 13, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 13 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 13, the memory elements 104 may store an application 118. In various embodiments, the application 118 may be stored in the local memory 108, the one or more bulk storage devices 110, or apart from the local memory and the bulk storage devices. It should be appreciated that the data processing system 100 may further execute an operating system (not shown in FIG. 13) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

In another aspect, the data processing system 100 may represent a client data processing system. In that case, the application 118 may represent a client application that, when executed, configures the data processing system 100 to perform the various functions described herein with reference to a "client". Examples of a client can include, but are not limited to, a personal computer, a portable computer, a mobile phone, or the like.

In yet another aspect, the data processing system 100 may represent a server. For example, the data processing system may represent an (HTTP) server, in which case the application 118, when executed, may configure the data processing system to perform (HTTP) server operations.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method of applying a coating to an external surface of a man-made object to be at least partly immersed in water for a time period wherein there is relative movement between the immersed object and the water, the method comprising:
   employing a computer-implemented coating selection process comprising:
      obtaining, for each coating in a set of coatings, a total roughness value of the external surface based on a fouling roughness value, a macro-roughness value and a micro-roughness value associated with each coating, where the fouling roughness value relates to a roughness associated with the settlement of marine fouling organisms to the man-made object;
      selecting a coating from the set of coatings, wherein the selected coating has the minimum resistance rating associated with the obtained total roughness value for the time period of all the coatings in the set of coatings;

wherein the method further comprises applying the selected coating to the external surface of the man-made object.

2. The method according to claim 1, wherein a calculation of the fouling roughness value associated with each coating comprises:
retrieving a roughness database that associates combinations of each coating and a geographical region where the man-made object is expected to be located during the time period with a respective static fouling roughness value;
retrieving the static fouling roughness value;
converting the static fouling roughness value to a dynamic fouling roughness value by accounting for an expected activity of the man-made object during the time period;
calculating the fouling roughness value based on the dynamic fouling roughness value and based on an expected change in the fouling roughness value with time.

3. The method according to claim 1, wherein at least one static fouling roughness value associated with a combination of a coating in the set of coatings and the geographical region has been derived by:
retrieving from a fouling database parameters relating to fouling of a plurality of man-made objects to be at least partly immersed in water that have been in the geographical region and to which the coating was applied;
calculating a fouling score based on the parameters for each man-made object in the plurality of man-made objects, yielding fouling scores;
calculating a representative value of the fouling scores;
obtaining the static fouling roughness value from a table associating the calculated representative value of the fouling scores with the static fouling roughness value.

4. The method according to claim 3, wherein the plurality of man-made objects is divided into at least two subgroups, wherein each of the at least two subgroups is associated with a respective range of fouling scores, wherein the respective ranges do not overlap and wherein each subgroup comprises only man-made objects that have fouling scores within the respective range of each subgroup; and
wherein for each subgroup a separate average is calculated, and subsequently a separate static fouling roughness value, a separate dynamic fouling roughness value, a separate fouling roughness value and a separate total roughness value.

5. The method according to claim 1, wherein the macro roughness value is derived by:
calculating a macro roughness score based on at least one of an initial substrate macro roughness score, a coating macro roughness score-, and a time-dependent macro roughness score;
calculating the macro roughness value based on the macro roughness score.

6. The method according to claim 1, wherein the micro roughness value is derived by:
calculating a micro roughness score based on an initial micro roughness score and a time-dependent microroughness score;
calculating the micro roughness value based on the micro roughness score.

7. The method according to claim 1, wherein the minimal resistance rating is calculated by a Computational Fluid Dynamics model based on at least one of the total roughness value, a shape and size of the man-made object, and an operational speed of the man-made object.

8. The method according to claim 1, wherein the external surface is segmented in at least two segments, and wherein the total roughness value of the external surface is a combination of the total roughness value of a first segment and the total roughness value of a second segment.

9. The method according to claim 8, wherein the external surface is segmented in a Boot Top part, a Vertical Side part and a flat Bottom part.

10. The method according to claim 1, wherein the selected coating is configured to protect against one of fouling, corrosion, solid and liquid particle abrasion, deterioration as a result of UV absorbance and ice.

11. The method according to claim 1, wherein the external surface of the man-made object to be at least partly immersed in water comprises a hull of a vessel.

12. The method according to claim 11, wherein the power requirement to move the vessel at a desired speed is calculated for the vessel hull coated with the selected coating.

13. The method according to claim 12, wherein the power requirement is converted into predicted fuel consumption or predicted green-house gas emissions.

14. The method according to claim 2, wherein at least one static fouling roughness value associated with a combination of a coating in the set of coatings and the geographical region has been derived by:
retrieving from a fouling database parameters relating to fouling of a plurality of man-made objects to be at least partly immersed in water that have been in the geographical region and to which the coating was applied;
calculating a fouling score based on the parameters for each man-made object in the plurality of man-made objects, yielding fouling scores;
calculating a representative value of the fouling scores;
obtaining the static fouling roughness value from a table associating the calculated representative value of the fouling scores with the static fouling roughness value.

15. The method according to claim 1 wherein the man-made object to be at least partly immersed in water is a vessel or an offshore drilling station.

16. The method according to claim 1, wherein the macro-roughness value relates to roughness elements originating from the surface of the object selected from plate waviness, plate laps, weld seams, bolts, steel profile, corrosion of the man-made object, damage to the man-made object, coating roughness, and coating defects.

17. The method according to claim 1, wherein the micro-roughness value relates to roughness elements originating from the surface of the coating material.

* * * * *